United States Patent
Gulik

(10) Patent No.: US 9,854,946 B1
(45) Date of Patent: Jan. 2, 2018

(54) BBQ CONVERTIBLE TONGS

(71) Applicant: Ryszard Gulik, Cocoa, FL (US)

(72) Inventor: Ryszard Gulik, Cocoa, FL (US)

( * ) Notice: Subject to any disclaimer, the term of this patent is extended or adjusted under 35 U.S.C. 154(b) by 0 days.

(21) Appl. No.: 15/607,513

(22) Filed: May 28, 2017

(51) Int. Cl.
| | |
|---|---|
| *A47J 43/28* | (2006.01) |
| *B25F 1/02* | (2006.01) |
| *A47J 43/18* | (2006.01) |
| *A47J 43/044* | (2006.01) |
| *B23K 103/04* | (2006.01) |

(52) U.S. Cl.
CPC .......... *A47J 43/283* (2013.01); *A47J 43/288* (2013.01); *B25F 1/02* (2013.01); *A47J 43/18* (2013.01); *A47J 43/28* (2013.01); *A47J 2043/04409* (2013.01); *B23K 2203/05* (2015.10)

(58) Field of Classification Search
CPC ......... A47J 43/18; A47J 43/28; A47J 43/283; A47J 43/288; A47J 2043/04409; A47G 21/02; A47G 21/06; A47G 21/10; B25F 1/02; B23K 2203/05
USPC ......... 294/3, 7, 10; 30/142, 147–150; 7/112, 7/113
See application file for complete search history.

(56) References Cited

U.S. PATENT DOCUMENTS

| | | | | |
|---|---|---|---|---|
| 2,961,766 | A * | 11/1960 | Maynard | A47J 43/283 12/142 F |
| 2,994,553 | A * | 8/1961 | Banton | A47G 21/06 294/106 |
| 3,356,405 | A * | 12/1967 | Gruber | A47J 43/283 294/16 |
| 4,711,029 | A * | 12/1987 | Somerset | A47G 21/045 294/7 |
| 2004/0026939 | A1* | 2/2004 | Jordan | A47J 43/288 294/3 |
| 2011/0044370 | A1* | 2/2011 | Schochet | A47J 43/283 374/155 |
| 2012/0297548 | A1* | 11/2012 | Solari | A47J 43/288 7/113 |

FOREIGN PATENT DOCUMENTS

GB          1 442 322      *    7/1976

* cited by examiner

*Primary Examiner* — Dean J Kramer
(74) *Attorney, Agent, or Firm* — Chen-Chi Lin

(57) ABSTRACT

Barbeque tools in the form of fork-spatula and knife-spatula work separately or as a tongs when interlocked together by cutout in the body of each tool that assures resilient hinged-like connection without use of spring, pinion, clasp or hinge, and allows using the closed tongs as a grill scraper at one end of tool, and grill or vessel grasper at the opposite end of tool, while bottle opener, can piercer, and can opener being integral parts of the spatulas and placed away from contact with operator's hands equally ensure a safe use of each spatula separately and while in tongs assembly.

8 Claims, 3 Drawing Sheets

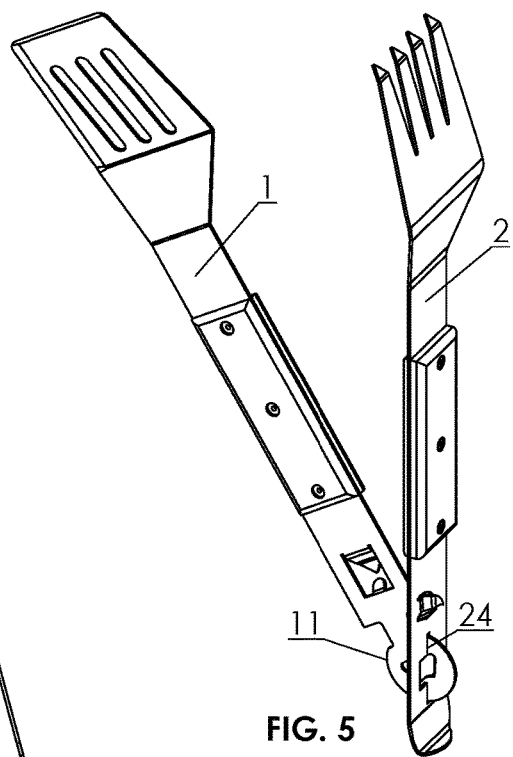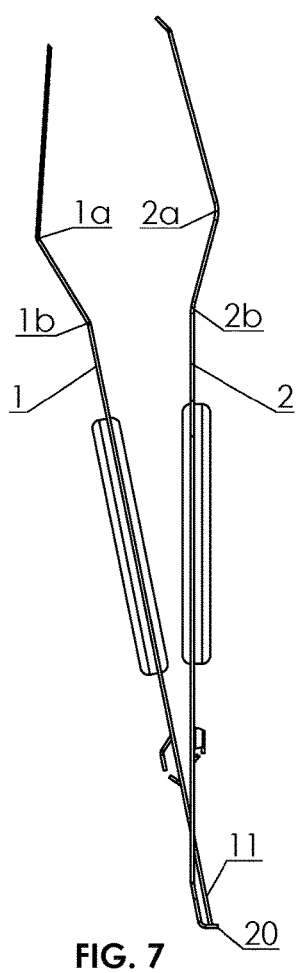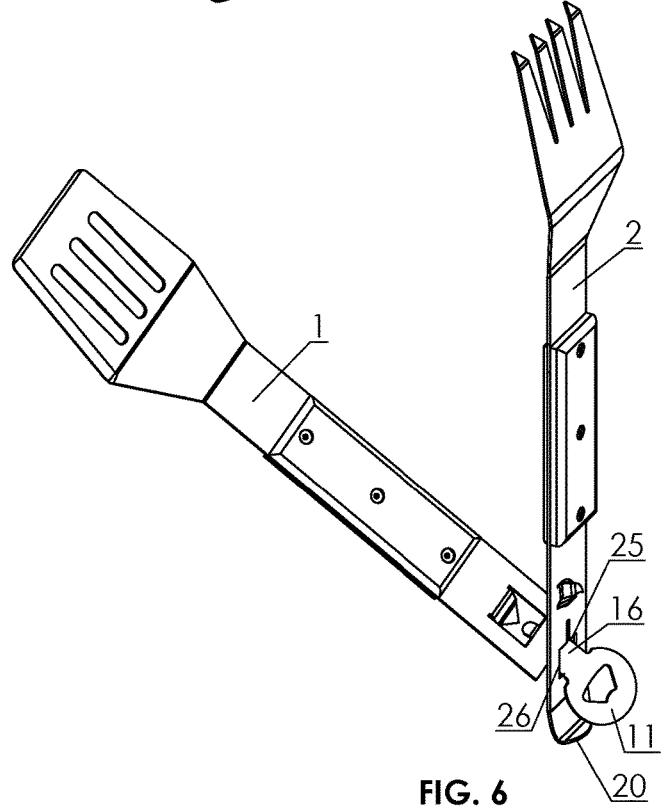
FIG. 5
FIG. 7
FIG. 6

DETAIL C

DETAIL D

BBQ CONVERTIBLE TONGS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. The Technical Field of the Invention

The disclosure generally relates to set of tools for food handling during grilling process and more specifically to the set of two tools where one is a fork and the other is a knife that work also as spatulas, and while both are interlocked together, they work as tongs, as a grill scraper, and grill grasper. Fork's body contains a can opener while knife's body contains juice can piercer and beer bottle opener, therefore together work as one multifunctional BBQ tool.

2. Description of Related Art

In one approach set of tools used for barbecue contains tongs, fork, hook, and spatula that may work as a knife. A set has also a bear bottle opener. Tongs, fork, spatula, and hook used separately or simultaneously with one other tool, require the other tools to store somewhere close by.

In another approach spatula alone works as fork or knife and often contains a beer opener. The problem with such approach is that a cook-operator still needs to use either tongs and separate fork or knife to manipulate a grilling food.

Yet another approach is to provide universal handles with exchangeable inserts that each performs a different function. The problem with such approach is that exchangeable parts have to be stored somewhere during food preparation so the parts may be easily misplaced. The other problem with such approach is that parts after initial use are not clean anymore and placing them back in the storage container or handling them afterward is not convenient.

Another approach is using the tongs of which one arm works as a knife and the other as a fork. The problem with such approach is that fork should be stationary during cutting with a knife so while the arms are not separable—additional tool is necessary.

Yet another approach is to separate both parts of tongs by utilizing spring loaded connection with oftentimes complex mechanism that lowers reliability of such tool.

Therefore, it is apparent that there is a need for a barbecue tool, which is cost-effective, easy to manufacture and store, and while used outside, to efficiently perform multiple and necessary functions, while also being compact enough to keep it in the usually limited storage space around BBQ.

BRIEF SUMMARY OF THE INVENTION

The present apparatus and methods described here in preferred embodiment meet the recognized need for basic barbecue tools in the form of knife and fork that each can work separately as spatula or, when interlocked together, can work as tongs. Cutouts placed in the foot sections allow resilient interlocking connection of both spatulas to function as tongs and allow hanging each tool separately or in one piece as tongs assembly. Sharp tools, namely a piercer and a can opener, are located away from contact with operator's hands ensuring safety of operation.

Patterns of knife-spatula and fork-spatula blank cuts from planar stainless steel sheet require additional operations such as sharpening edges, forming the cutouts of incorporated tools, bending, and connecting thermo-insulating material to become the finished product.

Tool grip of the handle contains two strips made from a thermo-insulating material in two different thicknesses: thin and thick, where thin strip is placed on the inner side of tool while a thick strip goes outside.

Stainless steel properties of knife and fork provide necessary resilience to operate tools assembled together as a tongs without any additional mechanism, added part, or process.

Cutting patterns integrated in the foot of tools allow forming can piercer in the knife and can opener in the fork. Sharp edges of the can opener and can piercer placed far from food handling parts stay clean unless being used accordingly. That way the sharp edges do not require the same amount of cleaning as the remaining parts of tools, lowering a chance of an unintentional injury to the operator. Foot ends of both knife and fork, usually directed towards the operator, are rounded to prevent injury from accidental piercing and ensure the tools' safe use. Lip-bend of fork foot provides a bearing for edge of circular shape of knife foot and allows alignment of the top edge of the knife-spatula with the bend of the fork-spatula tips for use as a scraper, where the top edge of the knife-spatula cleans the top of the grill, while bent tips of fork-spatula clean sides of the grill when knife-spatula and fork-spatula are assembled as tongs and are in closed position.

Tips of fork-spatula, bent towards working space, while assembled in tongs, provide additional gripping power during food handling, and while tongs are in closed position, lower a chance of accidental piercing by teeth of the fork and prevent unintentional cutting by sharp edges of the knife-spatula. Lateral teeth of fork-spatula, being wide and having tips bent, work as hooks for handling the food.

BRIEF DESCRIPTION OF THE DRAWINGS

Descriptions of drawings for the present and exemplary BBQ set of knife-spatula and fork-spatula provide a consistent reference with numerals denoting similar elements throughout, including details views and perspective views of fragments.

FIG. 5 is an illustration of the first step in a process of interlocking fork and knife spatulas to work together as a tongs;

FIG. 6 is an illustration of the second step in a process of interlocking fork and knife spatulas to work together as a tongs;

FIG. 7 is an illustration of knife-spatula interlocked with fork-spatula to work as a tongs;

Drawings illustrate present and exemplary BBQ set of knife-spatula and fork-spatula to explain structural and convertible properties of disclosure.

DETAILED DESCRIPTION

Use of actual terminology to describe exemplary and preferable embodiment of the present disclosure as illustrated in FIGS. 1-11 does not exclude any or other technical terminology or limit processes or shapes to describe similar products, which may lead to accomplishment of similar shape, function or purpose, and to be limited only by listed claims.

Figure 1:
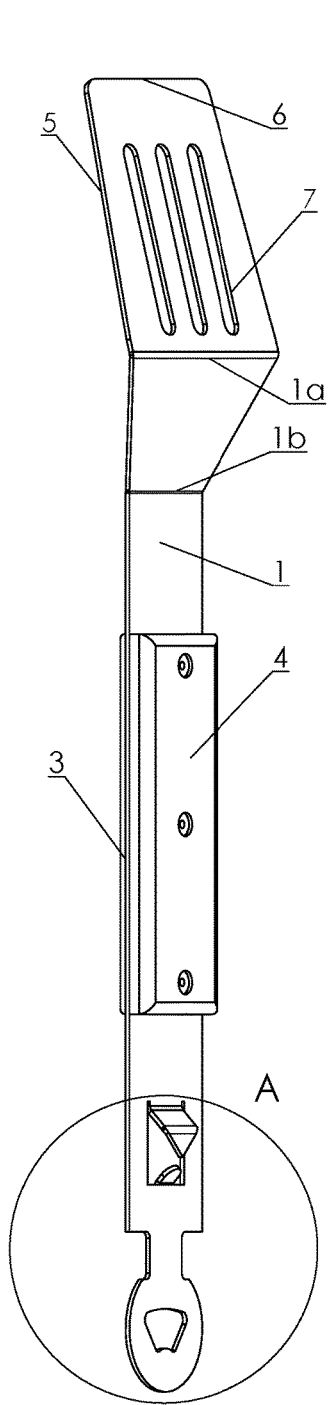
FIG. 1 is a dimetric view of the knife-spatula with indication of detail "A" of foot section.

Referring to FIG. 1, elongated pattern cutout from the planar stainless steel sheet after being mechanically formed and processed to work as a knife that functions also as a spatula has three parts distinguished by shape, function, and purpose.

A head of a knife-spatula 1 has two lateral edges 5 that while sharpened work as left-handed and right-handed knives. Top edge 6 of knife-spatula works as a part of a scraper and oblong cutouts 7 work as a meat juicer. Transitional trapezoidal shape of the knife-spatula is a part of the head. Obtuse angles of bend 1b and 1a place spatula away from the body to create food-handling space and enhance scooping of grilled food.

A handle works as a tool grip with a thin strip 3 of thermo-insulation material placed at the food handling side, and a thick strip 4 placed at the opposite side.

A foot works as an interlocking device and as a pivot for fork-spatula 2. A can piercer located below the handle on the side of the thick strip 4 is formed from the pattern cutout. The rounded foot works as a bottle opener and one part of the two-part grill grasper.

Figure 2:
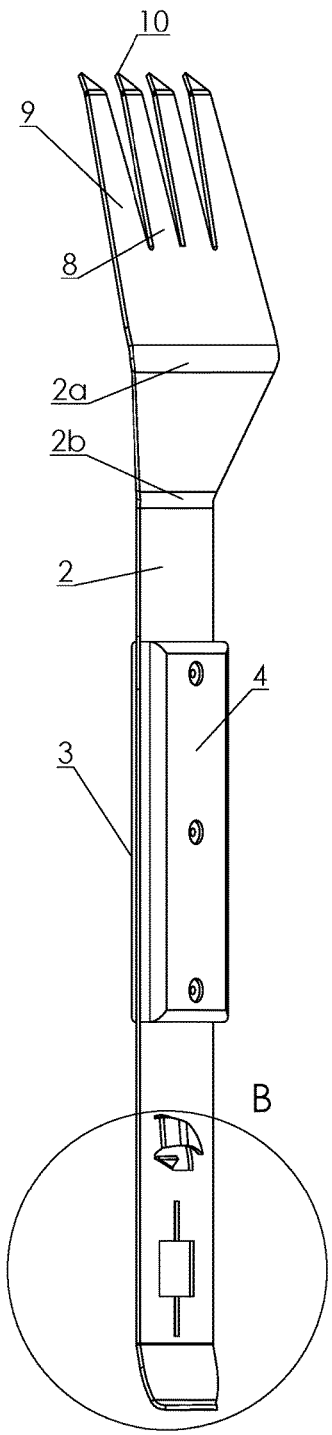
FIG. 2 is a dimetric view of the fork-spatula with indication of detail "B" of foot section.

Referring to FIG. 2, elongated pattern cutout from the planar stainless steel sheet, after being mechanically formed and processed to work as a fork that functions also as a spatula, has three parts distinguished by shape, function, and purpose.

A head of a fork-spatula 2 has multiple cutouts to form the shapes of teeth 8 and 9 along the top peripheral edge, where wide lateral teeth 9 are working as a hooks. Tips 10 of all fork teeth are bent not more than seven degrees in the direction of food handling side and provide better food grip without diminishing piercing ability of a fork and also work as a part of scraper.

Transitional trapezoidal shape of the fork-spatula is a part of the head. Obtuse angles of bend 2b and 2a move spatula away from the body to create food-handling space and enhance scooping of grilled food.

A handle works as a tool grip with a thin strip 3 of thermo-insulation material placed at the side of food handling, and a thick strip 4 placed at the opposite side.

A foot works as an interlocking device and yoke for knife-spatula 1. A can opener located below the handle on the side of the thick strip 4 is formed from the pattern cutout. The rounded foot of fork has projection-bend 19 and lip-bend 20, and while bent in such way that lip-bend 20 is perpendicular to the foot and is offset by projection-bend 19 from the foot at the resulted distance, provide alignment for heads of knife-spatula 1 and fork-spatula 2 in the assembly of tongs used as a scraper.

Figure 3:
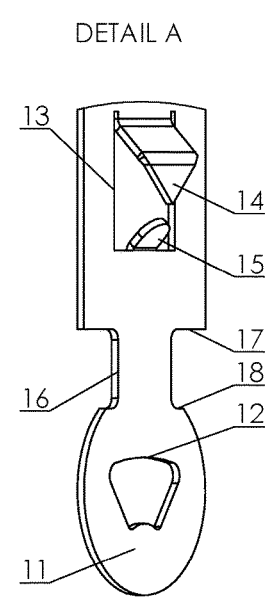
FIG. 3 is a dimetric view of detail "A" of knife-spatula foot section.

FIG. 3 illustrates a view of detail "A" of knife-spatula 1, where the circular end of the foot works as a locking circular shape 11, while cutout inside the circular shape works as a bottle opener 12. Shape of the cutout above the circular shape matches the yoke opening in fork-spatula 2 where locking neck 16, locking edge 17, and locking support edge 18 together function as a pivot. Can piercer is formed from the pattern of a can piercer cutout 13 located above the yoke and projecting on a side of the thick strip 4. A can piercer sharp edge 14 is formed from an upper cutout shape, while a can piercer lip 15 is formed from lower cutout shape.

Figure 4:
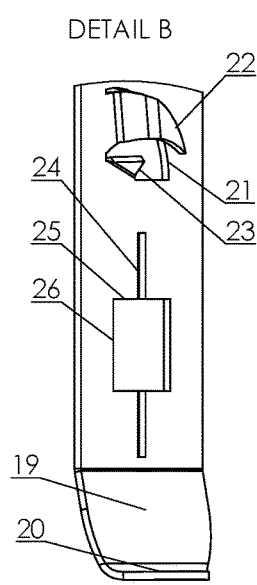
FIG. 4 is a dimetric view of detail "B" of fork-spatula foot section.

FIG. 4 illustrates a view of detail "B" of fork-spatula 2, where the yoke at the foot section consists of two types of shapes: vertical aperture 24 that accommodates the size of locking circular shape 11 of knife-spatula 1, and a rectangular cutout 26 that functions as a yoke. The length of the yoke horizontal edge 25 corresponds to the width of locking neck 16 in the foot of knife-spatula 1. The pattern cutout 21 for can opener located in the fork-spatula 2 above the yoke provides upper cutout shape to form can opener sharp edge 22 and a lower cutout shape to form the can opener lip 23, that work together as the can opener that is accessible from the side of the thick strip 4 of a handle. The rounded foot section of the fork-spatula 2 has two bends in the same direction as bends of can opener. The fork projection-bend 19 ensures the correct placement of the lip-bend 20 to work as a bearing for locking circular shape 11 of the knife spatula 1 in tongs assembly used as a scraper, and as a grasping face in a grasper illustrated in FIG. 11.

The following figures illustrate the two step process of interlocking fork-spatula and knife-spatula to work as tongs, where:

FIG. 5 illustrates the first step when foot in circular shape 11 of knife-spatula 1 passes from the side of working space to the opposite side of the fork-spatula 2 through the elongated vertical aperture 24.

FIG. 6 illustrates the second step, where foot in circular shape 11 of knife-spatula 1 is clear on the other side of fork-spatula 2, and locking neck 16 of knife-spatula 1 is turned in the rectangular cutout 26 of the fork-spatula 2 and ready to work as tongs utilizing resilient fixed connection between feet of fork and knife.

FIG. 7 illustrates the tongs assembly in open position, where the interaction of fork lip-bend 20 of fork-spatula 2 and locking circular shape 11 of knife-spatula 1 ensures the relative position of both spatulas.

Figure 8:
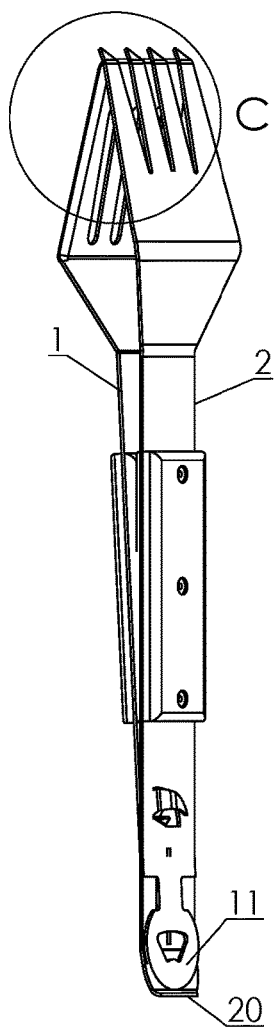
FIG. 8 is a diametric view of the tongs from fork-spatula side indicating detail "C" and showing relative position of locking head of knife-spatula and fork lip of fork-spatula that is acting as a bearing.

FIG. 8 illustrates the tongs assembly in closed position in a diametric view from the fork-spatula 2 side with an indication of the detail "C" and relative position of circular shape 11 of knife-spatula 1 and fork lip 20 of fork-spatula 2 at the foot. Tongs works as a scraper only while food-handling spaces of both tools face each other and are in closed position.

Figure 9:
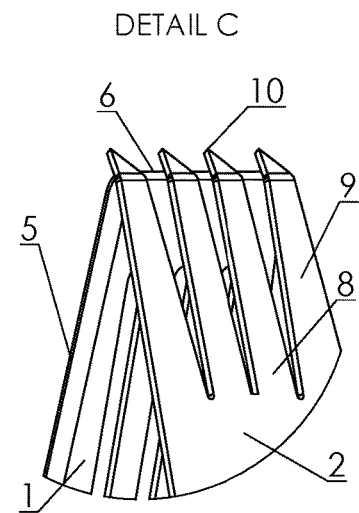
FIG. 9 is a detail "C" of head sections in dimetric view from fork-spatula side of tongs.

FIG. 9 illustrates the detail "C" of tongs assembly in diametric view from the fork-spatula 2 side, where bends of tips 10 of fork-spatula 2 are aligned with peripheral top edge 6 of knife-spatula 1. Closed tongs works as a scraper, in which side edges of tips 10 clean sides of a grill and peripheral top edge 6 cleans top of a grill. Wide lateral teeth 9 work as hooks when fork-spatula 2 is used individually.

Figure 10:
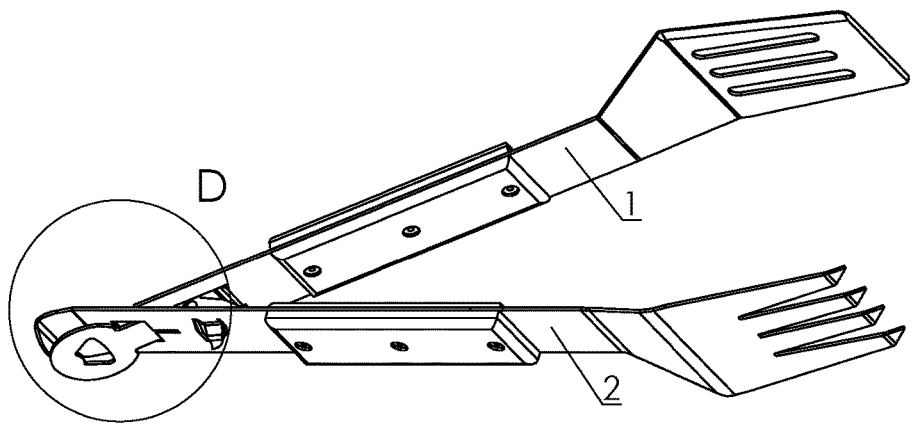
FIG. 10 is a diametric view of tongs indicating detail "D" of grasper.

FIG. 10 illustrates the tongs assembly in diametric view in open position for use as a grasper with indication of the detail "D".

Figure 11:
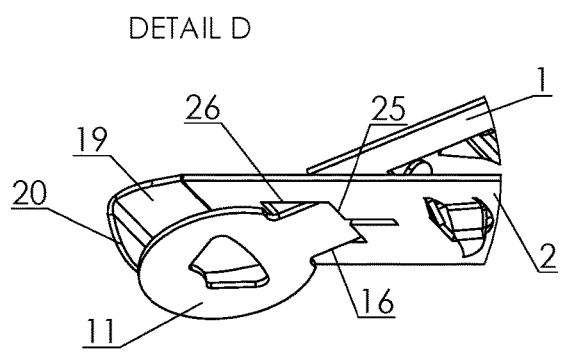
FIG. 11 is a dimetric view of detail "D" of grasper.

FIG. 11 illustrates the detail "D" of tongs assembly used as a grasper, where: fork projection-bend 19 with fork lip-bend 20 grasps, and together with the circular shape 11 of knife-spatula 1, holds an edge of a vessel, container, grill, or plate. Fork lip-bend 20 also guides the locking circular shape 11 and prevents misalignment of the knife-spatula 1 and fork-spatula 2 in tongs assembly.

The above embodiment of the invention of BBQ convertible tongs, in which the scope of the invention is described and illustrated hitherto, is determined by the appended claims.

I claim:

1. A knife-spatula comprising:
an elongated blank cut from a planar stainless steel sheet, the elongated blank cut comprising:
  a head;
  a handle; and
  a foot; each of the head, the handle and the foot having a distinguished shape, function, and purpose;
  wherein the head is located at one end of the elongated blank cut; the foot is located at an opposite end of the elongated blank cut; the handle is placed in between the head and the foot; and the head, the handle and the foot are formed into a final shape so as to become a part of the knife-spatula;
  wherein the head connects to the handle by a transitional trapezoidal shape having a couple of bends having obtuse angles on opposite sides of the elongated blank cut so as to offset the head from the handle and to provide a food-handling space to allow the head to move food on a grill; and
  wherein oblong cutouts of the head is configured as a meat juicer and lateral edges of the head are configured as side knives;
a thin insulation material strip is attached to a food-handling space side of the handle; and
a thick insulation material strip is attached to another side opposite the food-handling space side of the handle;
wherein the thin insulation material strip and the thick insulation material strip are configured to protect a hand of an operator from heat;
wherein the foot has a first patterned shape cutout and a second patterned shape cutout;
wherein the first patterned shape cutout is located closer to the handle and is configured as a can piercer; and
wherein the second patterned shape cutout is configured as a bottle opener placed inside a circular shape that is connected to the foot by a rectangular shape that is configured as a pivot.

2. The knife-spatula of claim 1, wherein the knife-spatula is configured to work as a left-handed knife, a right-handed knife, a spatula, the meat juicer, the can piercer, the bottle opener, or a grill top scrubber.

3. The knife-spatula of claim 1, wherein the foot of the knife-spatula is connected with a foot of a fork-spatula to form tongs.

4. The knife-spatula of claim 3, wherein the tongs are formed by inserting the circular shape of the foot of the knife-spatula through an elongated aperture of the foot of the fork-spatula so that the food-handling space of the knife-spatula faces a food-handling space of the fork-spatula.

5. The knife-spatula of claim 3, wherein the tongs in a closed position are configured to work as a grill scraper at a side of the head of the knife-spatula; and wherein the tongs in an open position are configured to work as a panhandle and grill or a hot vessel grasper at a side of the foot of the knife-spatula.

6. The knife-spatula of claim 3, wherein the tongs are operable by aligning the foot of the knife-spatula with the foot of the fork-spatula; and wherein a lip-bend of the foot of the fork-spatula provides bearing for an edge of the circular shape of the foot of the knife-spatula.

7. A fork-spatula comprising:
an elongated blank cut from a planar stainless steel sheet, the elongated blank cut comprising:
  a head;
  a handle; and
  a foot; each of the head, the handle and the foot having a distinguished shape, function, and purpose;
  wherein the head is located at one end of the elongated blank cut; the foot is located at an opposite end of the elongated blank cut; the handle is placed in between the head and the foot; and the head, the handle and the foot are formed into a final shape so as to become a part of the fork-spatula where;
  wherein the head connects to the handle by a transitional trapezoidal shape having a couple of bends having obtuse angles on opposite sides of the elongated blank cut so as to offset the head from the handle and to provide a food-handling space to allow the head to move food on a grill; and
  wherein two types of cutouts along a top peripheral edge of the head form farthermost teeth that are wider at bases so as to function as hooks; and wherein the farthermost teeth are bent no more than seven degrees in a direction toward the food-handling space;
a thin insulation material strip is attached to a food-handling space side of the handle; and
a thick insulation material strip is attached to another side opposite the food-handling space side of the handle;
wherein the thin insulation material strip and the thick insulation material strip are configured to protect a hand of an operator from heat;
wherein the foot has a first patterned shape cutout and a second patterned shape cutout;
wherein the first patterned shape cutout is located closer to the handle and is configured as a can opener;
wherein the second patterned shape cutout of a rectangular shape located farther from the handle is configured as a yoke; and
wherein a rounded end portion of the foot has couple of bends including a lip-bend perpendicular to a body of the handle so as to establish a bearing or grasping face.

8. The fork-spatula of claim 7, wherein the fork-spatula is configured to work as a fork, a spatula, a left-handed hook, a right-handed hook, or the can opener.

* * * * *